Jan. 28, 1964  Z. L. CSERNY ETAL  3,119,164
APPARATUS FOR MANUFACTURING CERAMIC ARTICLES
Filed Feb. 1, 1962  3 Sheets-Sheet 1

INVENTORS.
ZOLTAN L. CSERNY
GEORGE R. HARLOW
BY
Lewis M. Smith, Jr.
ATTORNEY

INVENTORS.
ZOLTAN L. CSERNY
GEORGE R. HARLOW
BY
ATTORNEY 3,119,164
APPARATUS FOR MANUFACTURING CERAMIC ARTICLES
Zoltan L. Cserny, Shrewsbury, and George R. Harlow, West Boylston, Mass., assignors to Norton Company, Worcester, Mass., a corporation of Massachusetts
Filed Feb. 1, 1962, Ser. No. 170,316
11 Claims. (Cl. 25—1)

The invention relates to built-up thin walled ceramic articles such as radomes and more particularly to apparatus for manufacturing such articles that utilizes all of the steps necessary for this purpose of the process disclosed in U.S. Patent No. 2,974,388, issued to Neil N. Ault March 14, 1961. The flame spraying gun employed in the apparatus disclosed herein may, for example, be that illustrated in U.S. Patent 2,707,691, issued to W. M. Wheildon, Jr., or an equivalent gun.

It is therefore the primary object of the invention to provide apparatus to produce homogeneously fused built-up ceramic articles, such as radomes, symmetrically shaped about a central axis. Another object of the invention is to provide apparatus that is readily adapted to vary the size and shape of the articles produced. Another object is to provide apparatus for producing ceramic articles of substantially uniform wall thickness. Another object is to provide automatic and consistently controlled apparatus for producing built-up ceramic articles such as radomes. Another object is to provide apparatus that will produce ceramic articles by flame spraying or any equivalent method over various shapes of interchangeable forms or patterns. Another object is to provide apparatus for producing built-up ceramic articles in which the temperature of the pattern is stabilized during manufacture. A still further object is to provide apparatus for producing ceramic articles that automatically deposits a uniform amount of ceramic material over the entire surface of the pattern regardless of its shape or variations in the area to be covered over different sections of the pattern. Other objects and advantages of the instant invention will become apparent from consideration of the following description in relation to the showing in the accompanying drawings illustrating the preferred embodiment of the invention, wherein:

Figure 1:
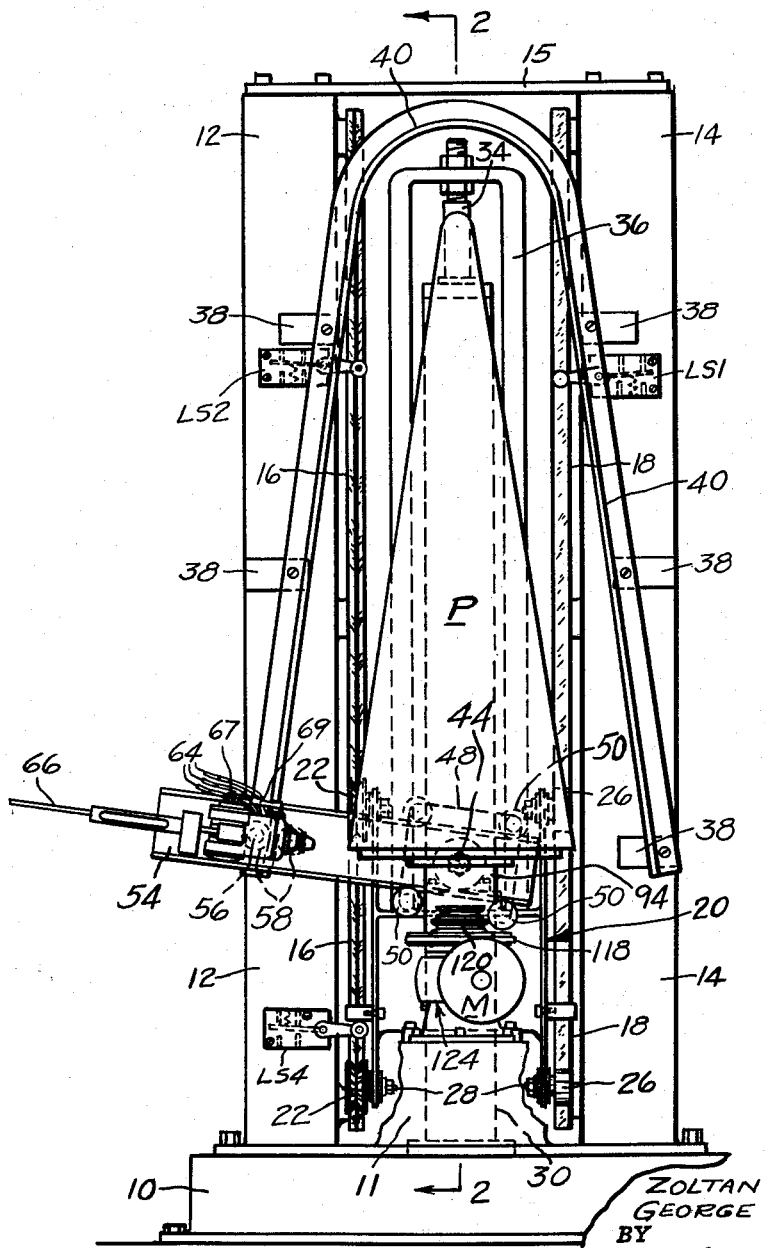
FIG. 1 is a front elevation of the preferred embodiment of the invention.

Briefly, the preferred embodiment of the invention comprises automatic apparatus for traversing a gun at a predetermined variable rate, spraying a ceramic material fed through it at a constant rate about a temperature stabilized, reusable pattern rotating at a constant rate. The ceramic spray gun is secured to a carriage freely radially movable and rotatable which is oriented and guided by a suitably shaped track or cam conforming substantially to the contour of the pattern, and the gun is maintained at a predetermined distance from the exterior surface of the pattern or form as it is traversed.

As the ceramic spray gun is traversed about the pattern by hydraulic actuating means, a fixedly mounted cam, similar in shape to the contour of the pattern, is continuously engaged by a follower member which operates a flow control valve controlling the rate of operation of the hydraulic actuating means and thereby varying the rate of traverse so that a uniformly built-up article is produced regardless of variations in the area that is to be covered per revolution of the pattern due to variations in the cross section of the pattern from end to end.

Referring particularly to the drawings wherein like reference numerals refer to like or corresponding parts, the apparatus comprises a base 10 upon which is fixed a pair of vertical supports 12 and 14 connected by a plate 15 at their upper ends. A slideway or track 16 having a V and a flatway on opposite edges thereof and a slideway or track 18 having opposed flatways are fixed to the vertical supports 12 and 14 and support a vertically movable slide or carriage 20. In order for the tracks 16 and 18 to properly maintain and support the carriage 20 a pair of V grooved rollers 22 and a pair of flat rollers 24 are rotatably attached to one side of the carriage 20 so that they respectively engage the V and flatway of the track 16. Mounted on the other side of the carriage 20 are two pairs of flat rollers 26 respectively disposed in engagement with the flatways of track 18. The rollers 22, 24, and 26 are mounted on well known eccentrically adjustable studs 28 so that good support can be obtained for the carriage 20. Also fixed to the base 10 and extending through a clearance hole in the slide or carriage 20 is a vertically positioned fluid motor or cylinder 30 having a piston 32 therein connected to a piston rod 34. The piston rod 34 is connected at its other end to a U-shaped bracket 36 secured to or integral with the carriage 20. When the fluid motor is actuated, it traverses the carriage 20 on the tracks 16 and 18.

Other means may be employed for traversing the carriage 20 such as a pulley and cable arrangement mounted on the vertical supports and connected to the carriage 20 and wound around a drum rotated by a rotary hydraulic motor through a gear reduction unit mounted on the base 10. An electrical motor could be used instead of either type of hydraulic motor by employing a conically shaped drum so that suitable acceleration and deceleration of the carriage 20 is had as the cable is wound around the drum. A more elaborate mechanism could be employed by utilizing a nut and screw mechanism rotated by a rotary fluid motor controlled in the manner described above through a gear reducer or, instead of the fluid motor, the screw could be rotated by a D.C. electric motor controlled by a cam actuated rheostat or potentiometer.

The members 12 and 14 have fixed to them a plurality of blocks 38 to which is fastened a predetermined shaped track or cam corresponding substantially to the contour of the pattern P. Different shaped tracks or cams and corresponding patterns may be employed. The ones illustrated in the drawings are representative of forms with which a radome may be produced.

Fixedly mounted on or integral with the slide or carriage 20 between its sides is a housing 42 in which a transversely positioned shaft 44 is rotatably supported in bearings 46. On the left hand end of the shaft 44 is fixedly mounted and keyed a rectangularly shaped guideway 48 including spaced pairs of V grooved rollers 50 rotatable on eccentrically adjustable shafts 52 similar to the shafts 28 mentioned above. A radially movable elongated slide or carriage 54 having opposed V ways on its opposite edges is disposed so that these V ways are engaged by the spaced pairs of rollers 50.

Projecting from the radially movable slide 54 is another pair of eccentrically adjustable shafts 56 on each of which a roller 58 is rotatably mounted. The rollers 58 engage opposite sides of the outwardly projecting portion of the shaped track or cam 40 with the slide 54 inserted between the rollers 50. Integral with or fixed to and extending from the left hand side of the radially movable slide 54 as seen in FIG. 1 is a bracket 60 illustrated in FIG. 2. The bracket 60 has fixed to it a ceramic flame spraying gun 62 of the general type disclosed in the above-mentioned patents and which are manufactured by Metallizing Company of America, Chicago, Illinois. It is deemed unnecessary to describe the construction of the gun since that information is available to the public and it forms no part of the instant invention.

The usual flexible conduits 64 for providing the necessary combustible mixture of air, acetylene, and oxygen are provided for the operation of the flame spraying gun 62. The ceramic rods 66 are either manually and continuously fed to the gun 62 or fed to the gun automatically by utilizing one of many well known feeding devices.

Figure 2:
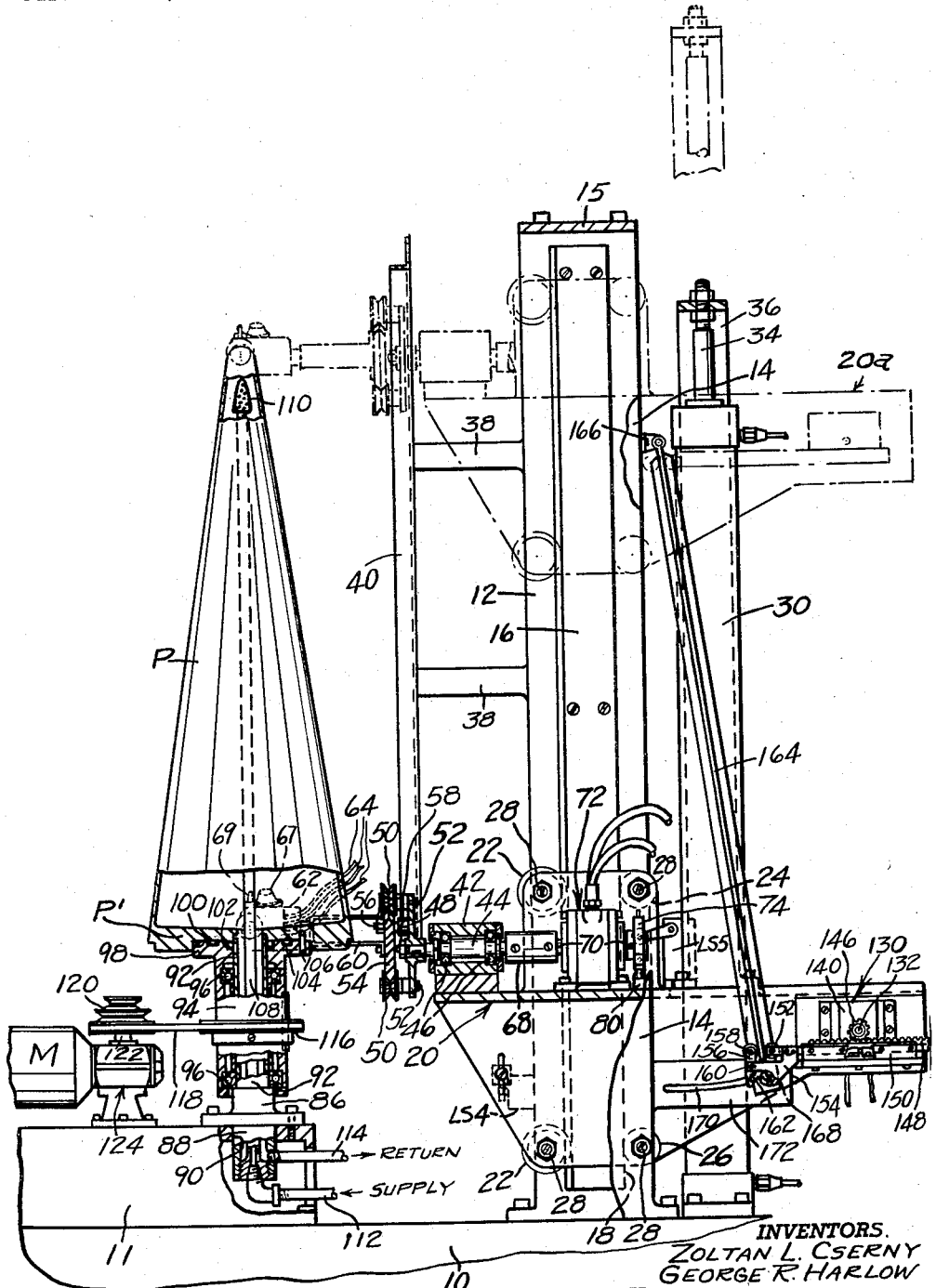
FIG. 2 is a side view showing some elements in vertical elevation and other elements in section by means of a partial section taken approximately on line 2—2 of FIG. 1.

Connected to the right hand end as seen in FIG. 2 of the shaft 44 supported in the housing 42 on the carriage 20 is a coupling 68 connected to the left hand end of a rotatable shaft 70 of a rotary fluid motor 72 which is commercially available and well known such as a Hydromotor manufactured by Excello Corp. of Detroit, Michigan. On the right hand end of the rotatable shaft 70 is adjustably fixed a rotatable stop plate 74 having surfaces 76 and 78 arranged to contact a stop pin 80 rigidly fixed to the slide or carriage 20 to stop rotation of the fluid motor 72. The rotatable stop plate 74 also has fixed to and projecting from the periphery thereof a pin 82 which, when rotated through a predetermined arc, actuates limit switches LS3 and LS5, the functions of which will hereinafter be disclosed.

It is seen that the body comprising pattern P illustrated in the drawings is conical in shape and has a spherically shaped nose portion which is tangent to the concentric conical portion and that the arc from one tangent point to the opposite tangent point, about 180°, is the total included angle to be traversed by the flame spraying gun 62 in response to operation of the fluid motor 72, and this is the included angle to which the surfaces 76 and 78 on the stop plate 74 described above limit the rotation of the gun 62 about the spherical nose portion by controlling the operation of motor 72. It will be understood that a new rotatable plate 74 may be required for different shaped patterns and that this plate is easily changed by loosening a set screw or similar means of attachment.

It also will be noted that the only function the rotary fluid motor 72 has is to rotate the gun 62 through the necessary arc and that the shaped track 40 conforming substantially to the shape of the pattern maintains the required distance between the pattern and the gun 62 during such rotation.

The means for supporting and rotating the pattern P is mounted on a raised hollow portion 11 of the base 10. A vertical hollow support member 86 is fixed to the portion 11 by screws and has a downwardly extending concentric portion 88 closely fitted in a bore 90 in the portion 11 of the base 10. Extending upwardly is a longer concentric portion 92 of the support member 86 that supports a housing 94 rotatable on a bearing 96 about the support member 86. Fixed or integral with the housing 94 is a flange 98 interfitted within a recess 100 of the base P' of the pattern P. In the flange 98 are two concentric recesses 102 and 104 in each of which is mounted a resilient sealing ring commonly known as O-rings. A pin 106 fixed to and extending from the flange 98 engages a hole in the pattern P to provide driving engagement between the flange 98 and the pattern P supported thereby.

Passing concentrically through and screwed to the hollow support member 86 at its downwardly extending portion 90 is a pipe 108 extending vertically through a clearance hole in the base P' of pattern P to a point adjacent the top or spherical nose portion of the pattern P. A fluid distributor or spray head 110 is screwed onto the upper end of the pipe 108 so that a fluid whose temperature is controlled by the usual known means is supplied from a supply pipe 112 and directed in all directions against the interior surface of the pattern P to stabilize its temperature. The fluid completely covers and drains down the interior wall, along the sloping base P' through the clearance hole in the base portion P' of the pattern P, into the space about the pipe 108 into the hollow support member 86 and out a return pipe 114.

It can be readily seen that the pattern P may be removed easily and be replaced by another of similar construction by simply lifting it off the flange 98 and pin 106 and over the fluid distributing head 110.

In order that the pattern may be rotated as shown in the instant invention, a sheave or pulley 116 is adjustably secured and keyed to the rotatable housing 94 and is connected by a belt 118 to a multiple grooved variable speed sheave or pulley 120 keyed to the output shaft 122 of a combined commercially available gear reducer 124 driven by an integrally attached motor M adjustably secured to the portion 11 of the base 10.

In the instant invention different rates of revolution of the pattern P may be had by simply removing the belt 118 after loosening the fastening means for the gear reducer 124 such as bolts slidable within elongated slots not shown in the portion 11 of the base 10. The pulley 116 is then aligned with the proper groove in the pulley 120 after first loosening the attachment means therefor such as a set screw to allow it to be moved axially of the housing 94, after which the set screw is tightened, the belt is replaced and tensioned by moving the gear reducer 124 and pulley 120 supported thereby, and the gear reducer 124 is secured fixedly to base portion 11 by tightening the fastening means therefor.

A commercially available modified pressure and temperature compensating flow control valve 130 such as those manufactured by Vickers, Inc. of Detroit, Michigan, is provided for controlling the rate of traverse of the spray gun 62 lengthwise of the pattern P according to its shape as it affects the surface area to be coated during one revolution of the pattern P at different points along the length of pattern P.

Referring particularly to the showing in FIG. 1 of the drawings of a pattern P tapered from a large base to a small top, with the pattern P rotating at a constant rate and the ceramic material being sprayed at a constant rate, the traversing rate of the spray gun 62 will have to be increased as it is moved up the left side of pattern P, since there is less and less area to be covered per revolution as it approaches the uppermost portion of the pattern P. Conversely, the traversing rate of the spray gun 62 will have to be decreased as it is moved down the right side of pattern P.

Figure 3:
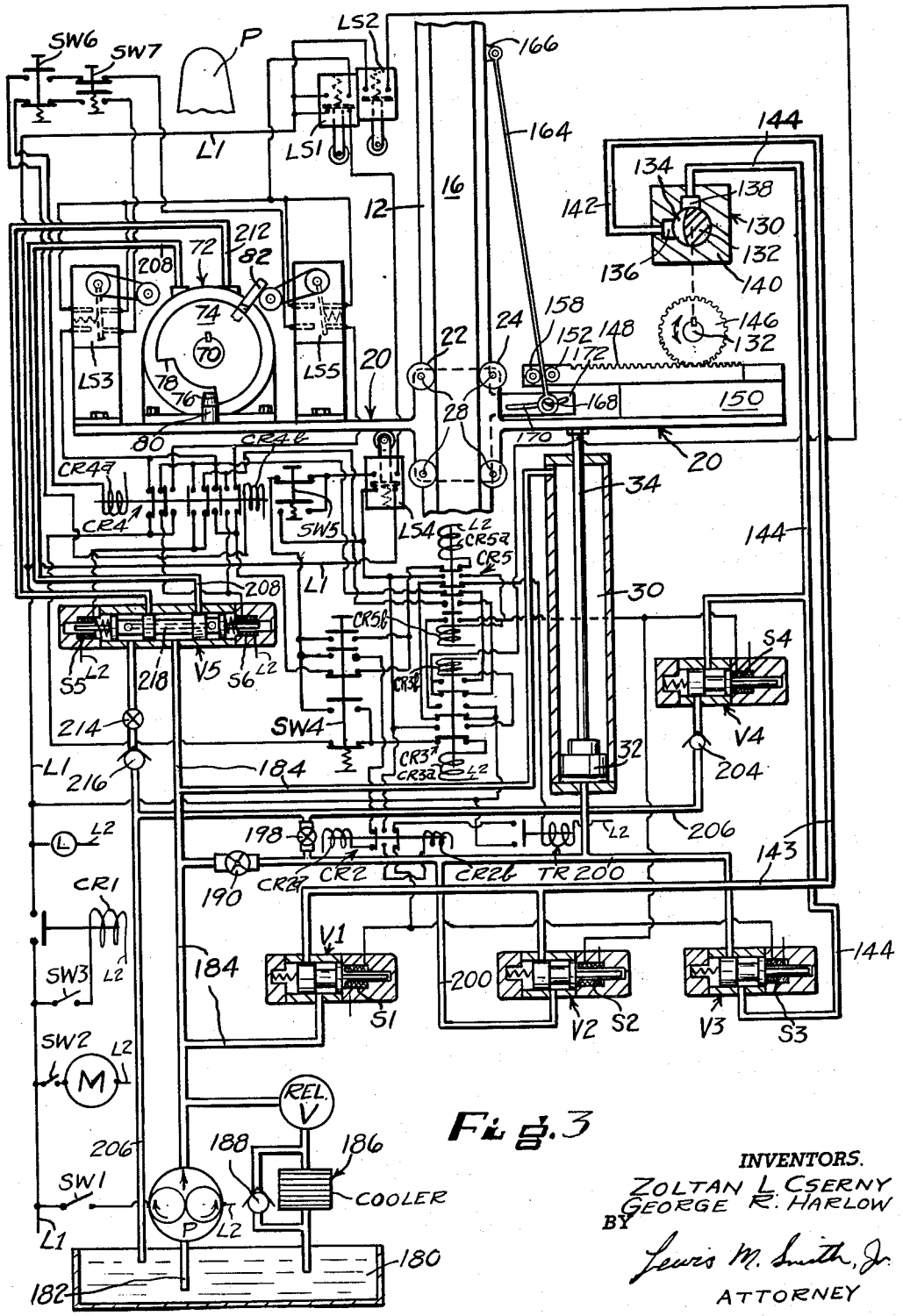
FIG. 3 is a combined diagrammatic representation of the preferred embodiment of the instant invention.

This rate variation is provided by a flow control valve 130, diagrammatically illustrated in FIG. 3 as comprising a rotatable metering shaft 132 provided with a partial groove or chamber indicated at 134 which connects a port or orifice 136 with a port or orifice 138 within a housing 140 fixed to the slide or carriage 20. The fluid conduits 142 and 144 are connected to the ports 136 and 138, respectively, as shown in FIG. 3. When the shaft 132 is rotated within the housing 140, it either increases or reduces the opening of the port or orifice 138 increasing or decreasing the volume of fluid passing through to or from the traversing cylinder 30. Keyed to the metering shaft 132 is a pinion 146 so that the flow control valve may be adjusted automatically. The pinion 146 engages a rack 148 slidable in a guide block 150 fixed to the carriage 20. The left hand end of the rack 148, as seen in FIG. 2, supports a roller 152 rotatably mounted thereon and a fixedly mounted bracket 154. An arm 156 supporting another roller 158 is rotatable on a pin 160 fixed to the bracket 154 and biased by a spring 162, thereby maintaining both rollers 152 and 158 in engagement with the opposite sides of an adjustable speed control cam 164 therebetween.

The speed control cam 164 is pivotally connected to a bracket 166 fixedly secured to the vertical support 14 and is adjusted by loosening a screw and nut means 168 engaging an elongated slot 170 in a bracket 172 fixedly secured to the vertical support 14. It can be seen that the speed control cam 164 for a given pattern is first adjusted and secured and thereafter remains stationary. The carriage 20 and the flow control valve 130 move up and down together. The speed control cam 164, which must conform to the particular shape that properly complements the particular pattern used, causes lengthwise movement of the rack 148 to rotate the pinion 146 and the shaft 132 accordingly, controlling the volume of fluid passing through the flow control valve 130 and thereby controlling the traverse rate of the piston 32 in the cylinder 30 and thence of the carriage 20 and the gun 62 supported thereby.

The preferred embodiment of the control system of the instant invention as illustrated in FIG. 3, which may of course be replaced by any other suitable system such as a pneumatic one, comprises an electrically driven hydraulic pump P which draws fluid from a reservoir 180 through a conduit 182 and supplies fluid under pressure to a main pressure fluid conduit 184 and its associated branches. An adjustable relief valve V is provided to maintain a predetermined amount of pressure in the system and excess fluid bypassed back to the reservoir 180 through valve V is passed through a cooler 186. In the event that the cooler becomes clogged a check valve 188 opens due to the increase in pressure and bypasses the excess fluid to the reservoir 180.

As shown in FIG. 3 of the drawings, the pressure fluid conduit 184 supplies fluid under pressure at all times directly to the cylinder 30 and against the smaller working face of the piston 32 and to a plurality of control valves V1, V2, V3, V4, and V5 actuated by solenoids S1, S2, S3, S4, S5 and S6 respectively. When the solenoids S1 and S3 are energized the spring biased spools of the valves V1 and V3 move toward the left. Fluid under pressure passes through the valve V1, through conduits 143 and 142, chamber 134 in the speed control valve 130, conduit 144, through now shifted valve V3, and conduit 200 into the cylinder 30 moving piston 32 and carriage 20 upwardly. The after of the working face of the piston 32 being greater at the lower end, fluid under pressure is forced back into the pressure fluid conduit 184 by the resulting upward movement of the piston 32. When the solenoids S1 and S3 are deenergized allowing the spools of the valves V1 and V3 to be moved to the right, the movement of the piston 32 is stopped because fluid cannot exhaust from the lower end of the cylinder 30. If it is desired to move the carriage 20 downwardly, solenoids S2 and S4 are energized, shifting the spool in each of the valves V2 and V4 toward the left, so that fluid may exhaust from the cylinder 30, through the conduit 200, valve V2, conduits 143 and 142, chamber 134 of the speed control valve 130, and conduit 144, through the now shifted valve V4, check valve 204, and through a return conduit 206 into the reservoir 180.

Since it may be necessary to adjust the position of the carriage 20 relative to the base 10 while testing or setting up the apparatus, hand operated valves 190 and 198 are provided to allow fluid under pressure directly into or to exhaust directly from the lower end of the cylinder 30 without passing through the other parts of the system. Opening the valve 190 allows fluid under pressure into the cylinder 30 to raise the carriage 20. Opening the valve 198 allows fluid to exhaust from the cylinder 30. However, during the automatic operation, both of these valves must be closed.

When the solenoid S5 is energized the spring centered spool in the valve V5 is moved toward the right allowing fluid under pressure from the pressure fluid conduit 184 to pass into a conduit 208, to one side of the rotary fluid motor 72 rotating the shaft 70, stop plate 74, shaft 44, guideway 48, radially movable slide 54 and spray gun 62 clockwise as seen in FIG. 1 or counter-clockwise as seen in FIG. 3. Rotation of these elements continues until the surface 78 of the stop plate 74 contacts the stop pin 80 at which time the limit switch LS3 is actuated by the pin 82. Fluid exhausting from the fluid motor passes through a conduit 212, valve V5, an adjustable throttle valve 214 and a check valve 216 in the return conduit 206.

Energization of the solenoid S6 moves the spring centered spool in the valve V5 toward the left. Fluid under pressure then passes from the pressure fluid conduit 184 into the conduit 212 and thence to the opposite side of the fluid motor 72 rotating it in a direction opposite to that described above, until the surface 76 of the stop plate 74 contacts the stop pin 80 as shown in FIG. 3, and the limit switch LS5 is actuated by the pin 82. Fluid exhausts through the conduit 208, a passage 218 in the spool of the valve V5, the adjustable throttle valve 214, check valve 216, and return conduit 206, into the reservoir 180.

In practicing the instant invention, the pattern upon which the article is to be produced is first coated with a soluble salt such as that described in the above mentioned Patent No. 2,974,388, so that the entire exterior surface of the pattern toward which the ceramic material is to be directed is completely covered, thereby preventing the adherence of the sprayed ceramic particles to the surface of the pattern. Instead, the sprayed ceramic particles adhere to the surface of the soluble salt coating. If any part of the pattern is exposed, removal of the ceramic article from the pattern becomes difficult, possibly resulting in a cracked or otherwise defective article.

After an article is built up to the desired dimensions, the pattern is then removed from the article by dissolving the soluble salt by suitable means such as by immersion of the article in water.

After the pattern P is prepared as above described, the correctly shaped track 40, stop plate 74, and speed or rate control cam 164 must be selected and secured to the apparatus in their proper positions, and the various limit switches LS1, LS2, LS3, LS4, LS5 must be adjusted to coact properly with these components. The switch SW1 is closed to start the electrically driven pump P supplying fluid under pressure into the system. Switch SW2 is then closed starting the motor M to rotate the pattern about a vertical axis.

The ceramic spray gun 62 is adjusted for rate of feed by a knob 67 and then loaded with the ceramic material to be sprayed, which may be in the form of the rod 66 automatically or manually fed to it. A valve is then opened by a lever 69 on the gun 62 and the combustible mixture ignited at the nozzle. Switch SW3 is then closed energizing the coil of the relay CR1, closing its normally open contacts, supplying power from line L1, illuminating a light L and passing current through a pair of closed contacts of a relay CR3 and a pair of closed contacts of a relay CR5, energizing the coil of a time delay relay TR, and closing its normally open contact immediately. When time delay relay TR is energized, current passes directly from line L1 through the now closed contacts of relay TR and a pair of closed contacts of a relay CR2, energizing solenoids S1 and S3 to shift the spools in the valves V1 and V3 and thereby allow fluid under pressure to start the piston 32, carriage 20, and gun 62, now spraying ceramic material as the rod 66 is moved into engagement with its feeding means, traversing upwardly at a rate controlled by the flow control valve 130 actuated by the control cam 164.

For a pattern P tapered as shown in the drawings, the control cam 164 will continually enlarge the port or orifice 138 during upward movement of the carriage 20 by rotating the metering shaft 132 clockwise as seen in FIG. 3 allowing a greater volume of fluid to be admitted to the lower end of the cylinder 30, continually accelerating the speed of traverse lengthwise of the pattern P proportional to the progressive reduction in the area of the pattern to be uniformly covered during each revolution thereof. Counter-clockwise rotation of the shaft 132 will produce the opposite effect as the carriage 20 is moved downwardly with the gun 62 directed at the other side of pattern P.

As the carriage 20 moves upwardly on the tracks 16 and 18, it releases a limit switch LS4 allowing its normally open set of contacts to open deenergizing the coil CR5*b* and its normally closed set of contacts to close, thus establishing circuits including manually operable switches which may be actuated to override the automatic operating cycle for this apparatus.

When the carriage 20 approaches the position 20*a* shown in FIG. 2, the gun 62 will be approaching the tangent point or line between the arc of the spherical nose portion and the side wall of the pattern. At this point, a limit switch LS1 is first actuated opening a set of normally closed contacts and closing a set of normally open contacts, passing power through a set of normally open, held closed contacts of a limit switch LS5 actuated by contact with the pin 82 of the stop plate 74. Power passes from there through a set of normally closed contacts of a relay CR4, a set of closed contacts of a multiple contact switch SW4, momentarily energizing coil CR5*a* opening the closed contacts and closing the open contacts of relay CR5. Opening of the contacts of the relay CR5 deenergizes the coil CR5*a* and the time delay relay coil TR opening its contacts after a short interval so that the carriage 20 can continue upwardly and provide a smooth transition to rotary movement. Opening of the time delayed contacts of TR deenergizes solenoids S1 and S3, allowing the spools in the valves V1 and V3 to be biased toward the right by springs shutting off the flow of fluid to the cylinder 30.

Shortly after the limit switch LS1 is actuated and before the solenoids S1 and S3 are deenergized by the opening of the time delayed contacts of relay TR to bring the carriage to rest in the position 202, another limit switch LS2 is actuated, closing its normally open contacts supplying power from line L1 through a set of closed contacts of a relay CR3, and now closed contacts of the relay CR5 whose contacts have just been shifted by the energization of the coil CR5*a*, through a set of closed contacts of the relay CR4, energizing the solenoid S5 and thereby shifting the spool of the valve V5 toward the right. Fluid under pressure passes through valve V5 rotating the hydraulic motor 72 and the gun 62 clockwise (FIG. 1) at a rate controlled by the manually adjustable throttle valve 214. As the fluid motor shaft 70 begins to rotate clockwise FIG. 1, or counter-clockwise as seen in FIG. 3, the stop plate 74 similarly rotates a pin 82 away from and thereby releasing the limit switch LS5, closing its normally closed contacts and opening its normally open contacts. Rotation of shaft 70 continues until the surface 78 of stop plate 74 contacts the pin 80, at which time the limit switch LS3 is actuated by the pin 82. At this point, the gun 62 continually fed with rods 66 is once again directed at the tangent point or line between the arc of the spherical nose portion and the side of the pattern P.

The normally closed contacts of the limit switch LS3 are opened and the normally open contacts are closed, supplying power from line L1, through the now closed normally open contacts of limit switch LS1 through a set of closed contacts of the relay CR4, a set of closed contacts of the switch SW4 and a closed set of contacts of the relay CR3 momentarily energizing the coil CR3*a*, opening the closed and closing the open contacts of the relay CR3. Opening of the closed contacts deenergizes the coil CR3*a* and solenoid S5, allowing the spring centered spool in the valve V5 to center, stopping the rotation of the fluid motor 72. Closing of the open contacts energizes the solenoids S2 and S4 through a now closed set of contacts of the relay CR5, shifting the spools in the valve V2 and V4 toward the left, allowing fluid to exhaust from the cylinder 30. Fluid exhausts through the valve V2, flow control valve 130, valve V4 and check valve 204 back to the reservoir 180. The decreasing rate of movement of piston 32, carriage 20 and the gun 62 being controlled once more by the continuous adjustment of the metering shaft 132 of the valve 130 by the control cam 164. When the carriage 20 starts moving downwardly, the limit switch LS2 is first released and shortly thereafter the limit switch LS1 is released, opening their normally open contacts and closing their normally closed contacts.

The carriage 20 continues to move downwardly at a predetermined decelerating rate until the switch LS4 is actuated, opening its normally closed contacts and closing its normally open contacts, supplying current from the line L1 momentarily to energize the coils CR5*b* and CR3*b* through now closed contacts of the respective relays CR5 and CR3. The contacts of the relays CR5 and CR3 are shifted into the position shown in FIG. 3, deenergizing the coils CR5*b* and CR3*b* and the solenoids S2 and S4 allowing the spools of the valves V2 and V4 to be spring biased toward the right. Shifting of the contacts of the relay CR3 against energizes the time delay relay TR closing its normally open contacts allowing current to pass from the line L1 through the closed contacts of relay CR2 energizing the solenoids S1 and S3, shifting the valves V1 and V3 to again move the carriage 20 supporting gun 62 upwardly in the manner above described to initiate a return cycle.

The return cycle begins with the gun 62 situated on the right hand side of the apparatus opposite that shown in FIG. 1, and the upward movement of the carriage 20 releases the switch LS4. The upward movement of the carriage 20 continues at the rate controlled by the speed control cam 164 until the carriage once more approaches the upper limit position 20*a* indicated in FIG. 2. At this point in the cycle the stop plate 74 is disposed with the surface 78 in engagement with the pin 80 and with the pin 82 engaging limit switch LS3 so that its normally open contacts are held closed and its normally closed contacts are held open.

When the carriage 20 actuates the limit switches LS1 and then LS2 as it approaches position 20*a*, it supplies current to first momentarily energize the coil CR3*a* shifting the contacts of the relay CR3 and thereby deenergizing the time delay relay TR and, after a short time delay, the solenoids S1 and S3 of the valves V1 and V3. Power is also supplied from the line L1 through the later closed contacts of LS2, and relays CR3 and CR5, shortly before the relay TR times out deenergizing the solenoids S1 and S3, thereby energizing the solenoid S6 to shift the spool in the valve V5 toward the left. Fluid under pressure admitted through valve V5 rotates the fluid motor 72, stop plate 74, and the gun 62 counter-clockwise as seen in FIG. 1 and clockwise as seen in FIG. 3, first releasing limit switch LS3 and then actuating limit switch LS5 when the surface 76 of the stop plate 74 approaches the stop pin 80, the position shown in FIG. 3.

The closing of the normally open contacts of the limit switch LS5 energizes the coil CR5*a*, deenergizing the solenoid S6, allowing the spool in the valve V5 to center. Also energized are the solenoids S2 and S4, shifting the spools in the valves V2 and V4 to the left, exhausting fluid from the cylinder 30 starting the carriage 20 and gun 62 downwardly to the original starting position. During the descent of the carriage 20, the limit switch LS2 and thereafter the limit switch LS1 are released. When the carriage 20 reaches its original starting position the limit switch LS4 is again actuated closing its normally open contacts. The coils CR3*b* and CR5*b* are energized shifting the contacts in the relays CR3 and CR5, deenergizing the solenoids S2 and S4, allowing the spools of the valves V2 and V4 to shift, closing off the exhaust of fluid from the cylinder 30.

The closing of the contacts of the relays CR3 and CR5 also allows the energization of the time delay relay TR and the solenoids S1 and S2 to initiate another cycle as above described until the article is built up to the desired dimensions at which time the switch SW3 is opened and the lever 69 of the gun 62 is actuated, stopping the operation.

Suitably positioned and adjusted indicator gages may be supported upon the portion 11 of the base 10 in juxta position to the article to be measured, to measure the surface contour of the build-up article produced with the apparatus disclosed herein, in order to determine whether or not it conforms to the required shape and dimensional limits. One suitable arrangement for this purpose comprises a plate shaped to complement the contour of the article and arranged to be supported on the portion 11 of the base 10 or otherwise in such a position that dial indicator gages supported thereby may be disposed with their respective probes lying in a vertical plane intersecting the axis of rotation of the pattern P and arranged perpendicular to the respective portions of the surface of the article to be engaged thereby.

If it is desired to operate the apparatus manually, such as when setting up the machine or when, during its operation, it becomes necessary to change the direction of traverse of the gun 62 at a point other than at either end of the traversing movement, the multiple contact switch SW4 may be momentarily actuated manually at any time during upward movement of the carriage 20 and gun 62 to reverse the direction of travel. Power is supplied from the line L1 through the normally closed contacts of limit switches LS1 and LS4, through the normally closed contacts of a switch SW5, and the normally open but momentarily closed contacts of the switch SW4, to energize the coils CR2a, CR5a, and CR3a shifting the contacts of the relays CR2, CR5, and CR3, deenergizing the time delay relay TR and solenoids S1 and S3 and energizing the solenoids S2 and S4 to initiate downward movement of the carriage 20. In this instance the solenoids S1 and S3 are deenergized immediately, since their deenergization does not depend upon the time delayed opening of the contacts of relay TR.

Similarly, to reverse the direction of traverse of the gun 62 when the carriage 20 is moving downwardly, another switch SW5 may be momentarily actuated manually. Actuating the switch SW5 opens its normally closed contacts and closes its normally open contacts. Power is supplied from line L1, through normally closed contacts of the limit switches LS1 and LS4 and the normally open but momentarily closed contacts of switch SW5, energizing the coils CR5b and CR3b, shifting the contacts of the relay CR5 and CR3 into the position shown in FIG. 3. It will be noted from inspection of the circuits shown in FIG. 3 that actuation of switch SW5 will also energize the coil CR2b to shift relay CR2 to the position shown if it has previously been shifted in the opposite direction by energizing coil CR2a as described above. Shifting of the contacts of the relays CR5 and CR3 deenergizes the solenoids S2 and S4 and energizes the time delay relay TR, and thence solenoids S1 and S3 to initiate upward movement of the carriage 20.

Noting that the normally closed contacts of the limit switches LS3 and LS5 are closed during rotation of the fluid motor 72 in either direction, the direction of rotation of the fluid motor 72 may also be reversed if desired while it is rotating by momentarily actuating one of a pair of switches SW6 and SW7.

Actuation of the switch SW7, when the fluid motor 72 is rotating clockwise as seen in FIG. 3 or counter-clockwise as seen in FIG. 1, supplies power from the line L1 through the normally open now closed contacts of the limit switch LS1, because the carriage 20 is in the up position. Power passes through the closed contacts of the limit switch LS3, the momentarily closed contacts of switch SW7 and the closed contacts of switch SW6, energizing the coil CR4a, thereby shifting the contacts of the relay CR4 to the right opening one set of contacts to denergize the solenoid S5 and closing another set of contacts to energize the solenoid S6 by means of current flowing from line L1 to relay CR4 through the closed contacts of the limit switch LS2, and contacts of the relays CR3 and CR5.

Actuation of the switch SW6, when the fluid motor 72 is rotating counter-clockwise as seen in FIG. 1 and clockwise as seen in FIG. 3, also supplies power from the line L1 through the now held closed normally open contacts of the limit switch LS1, the normally closed now closed contacts of the limit switch LS5, normally closed contacts of the switch SW7, and the momentarily closed contacts of switch SW6, energizing the coil CR4b, shifting the contacts of relay CR4 back into the position shown in FIG. 3, thereby deenergizing the solenoid S6 and energizing the solenoid S5.

When the ceramic article is built up to the desired dimensions, the pattern P with the ceramic article built upon it is removed and the built up ceramic article is removed after dissolving the soluble salt coating in a manner described above and in the above mentioned Patent 2,974,388.

While one of the stated objects of this invention is the provision of apparatus for producing ceramic articles of substantially uniform wall thickness, it will be evident from consideration of the above description of this apparatus that it is readily adaptable to the production of ceramic articles characterized by controlled variation of the wall thickness lengthwise of the article produced. Such a variation in wall thickness can be effected by appropriate modification of the shape of the speed control cam 164 and/or by modifying the position of cam 64 relative to the vertical support 14 to which it is secured.

It thus can be seen that there has been provided in this invention, a dependable apparatus and a method in which the various objects hereinabove set forth together with many thoroughly practical advantages are successfully achieved. Moreover, the apparatus has wide flexibility in that it is adaptable to produce articles of many different shapes.

As many possible embodiments may be made of the above invention and as many changes might be made in the embodiment above set forth, it is to be understood that all matter hereinbefore set forth or shown in the accompanying drawings is to be interpreted as illustrative and not in a limiting sense, and that the scope of this invention is defined by the claims appended hereto.

What is claimed is:

1. Apparatus for producing elongate ceramic articles closed at one end and symmetrical about a longitudinal axis comprising a base, a pair of spaced vertical supports on said base, a pair of vertical tracks one on each vertical support, a vertically movable carriage supported by said tracks, means to traverse said vertically movable carriage along said tracks, a horizontally positioned shaft rotatably supported by said vertically movable carriage, a guideway supported by and rotatable with said shaft, a radially movable slide supported by and rotatable with said guideway in a predetermined first vertical plane, means for flame spraying ceramic material supported by said radially movable slide, means connected to said shaft to rotate said means for flame spraying ceramic material about said shaft relative to said vertically movable carriage in a second vertical plane spaced from and parallel to the first vertical plane, a hollow pattern situated on the base with its longitudinal axis disposed vertically substantially coincident with the second vertical plane, means operable to rotate said pattern about its longitudinal axis, means to distribute a temperature stabilizing medium against the inside of the pattern, means operable to actuate said traversing means and said rotating means in a predetermined sequence to traverse the means for flame spraying ceramic material lengthwise of one side, around one end and lengthwise of the other side of the pattern, and means supported by said vertical supports engaging said radially movable slide and effective to maintain the means for flame spraying ceramic material at a predetermined distance from the pattern while it is traversed about the pattern.

2. Apparatus for producing hollow elongate ceramic articles closed at one end and symmetrical about a longitudinal axis, said apparatus comprising a base, a vertical support mounted upon said base, a straight vertical track on said vertical support, a vertically movable carriage supported by said track, means including a reversible carriage drive means to traverse said vertically movable carriage up and down said track, a horizontally positioned shaft rotatably supported by said vertically movable carriage, a rotatable guideway fixedly secured to said shaft, a slide supported by said rotatable guide for movement radially relative to said shaft, means for flame spraying ceramic material fixedly secured to said radially movable slide for movement in a predetermined vertical plane, means including a reversible slide drive means to rotate said means for flame spraying ceramic material relative to said vertically movable carriage, an elongate symmetrical pattern mounted on said base for rotation on its axis of symmetry about a vertical axis coincident with the predetermined vertical plane, means to rotate said pattern at a predetermined rate, cam means supported by said vertical support and engaging said radially movable slide so shaped as to maintain the means for flame spraying ceramic material at a predetermined distance from the surface of the pattern, and control means automatically operable to traverse the means for flame spraying ceramic materials cyclically lengthwise along one side, around one end, and lengthwise along the other side of the pattern, said control means including means sequentially automatically operable upon the carriage drive means to move said carriage upwardly a predetermined distance, then upon the slide drive means to rotate said slide in one direction through a predetermined angle, then upon the carriage drive means to move said carriage downwardly the same predetermined distance, then upon the carriage drive means to move said carriage upwardly the same predetermined distance, then upon the slide drive means to rotate said slide in the opposite direction through the same angle, and then upon the carriage drive means to move said carriage downwardly the same predetermined distance to complete each automatic traversing cycle and to condition the control means for the next automatic traversing cycle.

3. Apparatus as described in claim 2, and, in addition, first regulating means automatically adjustable during traversing cycles to control the rate of movement of said carriage by regulating the rate of operation of said carriage drive means, said first regulating means including a cam element fixedly secured to said vertical support and a follower element engaging said cam element and supported upon said carriage for movement therewith relative to said cam element and second regulating means adjustable to control the angular rate of movement of said slide by regulating said slide drive means to operate at a predetermined constant rate.

4. Apparatus as described in claim 2, wherein the means sequentially automatically operable included in said control means include a first switch means operable through a time delay circuit as said carriage approaches a predetermined position during the upward movement thereof produced by said carriage drive means to deactivate said carriage drive means after a predetermined time delay, and a second switch means actuated by upward movement of said carriage during the predetermined time delay to activate said slide drive means to produce continued movement of the means for flame spraying ceramic material in the same direction relative to the pattern at substantially the same traversing rate.

5. Apparatus as described in claim 2, and, in addition, manually actuated means selectively operable while said reversible carriage drive means is activated by said control means to reverse the direction of operation of said carriage drive means, and manually actuated means selectively operable while said reversible slide drive means is activated by said control means to reverse the direction of operation of said slide drive means.

6. Apparatus for producing hollow elongate ceramic articles closed at one end and symmetrical about a longitudinal axis, said apparatus comprising a base, a pair of spaced vertical supports on said base, a pair of straight vertical tracks one on each vertical support, a vertically movable carriage supported by said tracks, means including a linear acting fluid motor to traverse said vertically movable carriage up and down said tracks, a horizontally positioned shaft rotatably supported by said vertically movable carriage, a rotatable guideway fixedly secured to said shaft, a movable slide slidably supported by said rotatable guideway for movement radially of said shaft, means for flame spraying ceramic material fixedly secured to said radially movable slide for movement in a predetermined vertical plane, means including a rotary fluid motor operable to rotate said means for flame spraying ceramic material relative to said vertically movable carriage, an elongate symmetrical hollow pattern mounted on said base adjacent the means for flame spraying ceramic material for rotation on its axis of symmetry about a vertical axis coincident with the predetermined vertical plane, means to rotate said pattern at a predetermined rate, means to distribute a temperature stabilizing medium against the internal surface of the pattern, cam means supported by said vertical supports and engaging said radially movable slide effective to maintain the means for flame spraying ceramic material at a predetermined distance from the surface of the pattern, and control means cyclically operable to traverse the means for flame spraying ceramic materials lengthwise along one side, around one end, and lengthwise along the other side of the pattern automatically, said control means including means sequentially automatically operable upon the linear acting fluid motor to move said carriage upwardly a predetermined distance, then upon the rotary fluid motor to rotate said slide in one direction through a predetermined angle, then upon the linear acting fluid motor to move said carriage downwardly the same predetermined distance, then upon the linear acting fluid motor to move said carriage upwardly the same predetermined distance, then upon the rotary fluid motor to rotate said slide in the opposite direction through the same angle, and then upon the linear acting fluid motor to move said carriage downwardly the same predetermined distance, thereby providing for automatic cyclic operation of said apparatus.

7. Apparatus as described in claim 6, and, in addition, first regulating means selectively adjustable during traversing cycles to control the rate of movement of said carriage by regulating the rate of operation of said linear acting fluid motor, said first regulating means including a cam element fixedly secured to said vertical support, a follower element engaging said cam element and slidably supported upon said carriage for movement therewith relative to said cam element, a flow control valve for said linear acting fluid motor operatively connected to and controlled by said follower element, and second regulating means comprising a second flow control valve adjustable to control the rate of angular movement of said slide by regulating said rotary fluid motor so that said rotary fluid motor operates at a predetermined constant angular rate.

8. Apparatus as described in claim 7, wherein the means sequentially automatically operable included in said control means include a first limit switch operable through a time delay circuit as said carriage approaches a predetermined position during the upward movement thereof produced by said linear acting fluid motor to deactivate said linear acting fluid motor after a predetermined short time delay, and a second limit switch actuated by upward movement of said carriage during the predetermined time delay to activate said rotary fluid motor to produce continued movement of the means for flame sparying ceramic material in the same direction relative to the pattern at substantially the same traversing rate.

9. Apparatus for spray coating an elongate body closed at one end and symmetrical about its longitudinal axis, said apparatus comprising a base, a straight slideway fixedly secured to said base so that it is disposed in a first predetermined plane, a first slide mounted for sliding movement along said slideway, means to traverse said first slide relative to said slideway, means fixedly secured relative to said base for supporting a body to be sprayed for rotation about its longitudinal axis with its longitudinal axis disposed parallel to said slideway, a shaft rotatably supported by said first slide perpendicular to the first predetermined plane, means mounted on said first slide operable to rotate said shaft, a guideway supported by said shaft for rotation in a second plane parallel to the first predetermined plane, a second slide supported by and movable radially of said guideway relative to said shaft, cam means engaging and controlling the radial movement of said second slide, spray discharging means fixedly secured to said second slide for movement in a third plane parallel to the first predetermined plane and intersecting the longitudinal axis of a rotating body to be sprayed, and control means for operating said means to traverse said first slide and said means operable to rotate said shaft so as to traverse said spray discharging means about a body to be spray coated at a continuously controlled rate first lengthwise along one side of a given body and then around the closed end of a given body and then along the other side of a given body.

10. Apparatus as described in claim 9 wherein said cam means is so shaped and located in relation to the longitudinal cross section of a body to be spray coated that said spray discharging means is maintained at a predetermined distance from the surface of a given body to be spray coated as said spray discharging means is traversed about a given body.

11. Apparatus for producing hollow elongate ceramic articles closed at one end and symmetrical about a longitudinal axis, said apparatus comprising a relatively fixed base, a vertically disposed support fixedly secured to said base, a straight vertical track fixedly secured to said vertical support, a carriage mounted upon and movable lengthwise of said track, a linear drive means selectively operable to move said carriage upwardly and downwardly along said track, a horizontal shaft rotatably supported on said carriage, a rotary drive means mounted upon said carriage and connected to said shaft selectively operable to rotate said shaft in one direction or the other, a guideway fixedly secured to said shaft and rotatable therewith, a slide supported by said guideway movable radially of said guideway relative to said shaft, means for flame spraying a ceramic material fixedly secured to said slide, a reusable hollow pattern closed at one end and symmetrical about its longitudinal axis supported upon said base with its longitudinal axis vertically disposed, means operable to rotate said hollow pattern about its longitudinal axis, means to distribute a temperature stabilizing medium against the inside surface of said hollow pattern, control means for said linear drive means and said rotary drive means operable automatically and continuously to traverse said means for flame spraying ceramic material lengthwise along one side of said pattern, around the closed end of said pattern, and lengthwise along the other side of said pattern, said control means including rate regulating means adjustably fixedly secured to said support to vary the rate of traverse of said means for flame spraying said ceramic material lengthwise of a given pattern according to the shape and size of said pattern, and cam means fixedly secured to said vertical support and engaged by said radially movable slide to maintain said means to flame spray a ceramic material at a predetermined distance from a given pattern.

References Cited in the file of this patent

UNITED STATES PATENTS

| | | |
|---|---|---|
| 2,345,834 | Schweitzer | Apr. 4, 1944 |
| 2,781,738 | Paasche | Feb. 19, 1957 |
| 2,840,038 | Verba | June 24, 1958 |
| 2,866,434 | MacArthur et al. | Dec. 30, 1958 |
| 2,885,998 | Farries | May 12, 1959 |
| 2,922,391 | Olson et al. | Jan. 26, 1960 |
| 2,974,388 | Ault | Mar. 14, 1961 |